United States Patent Office 3,445,119
Patented May 20, 1969

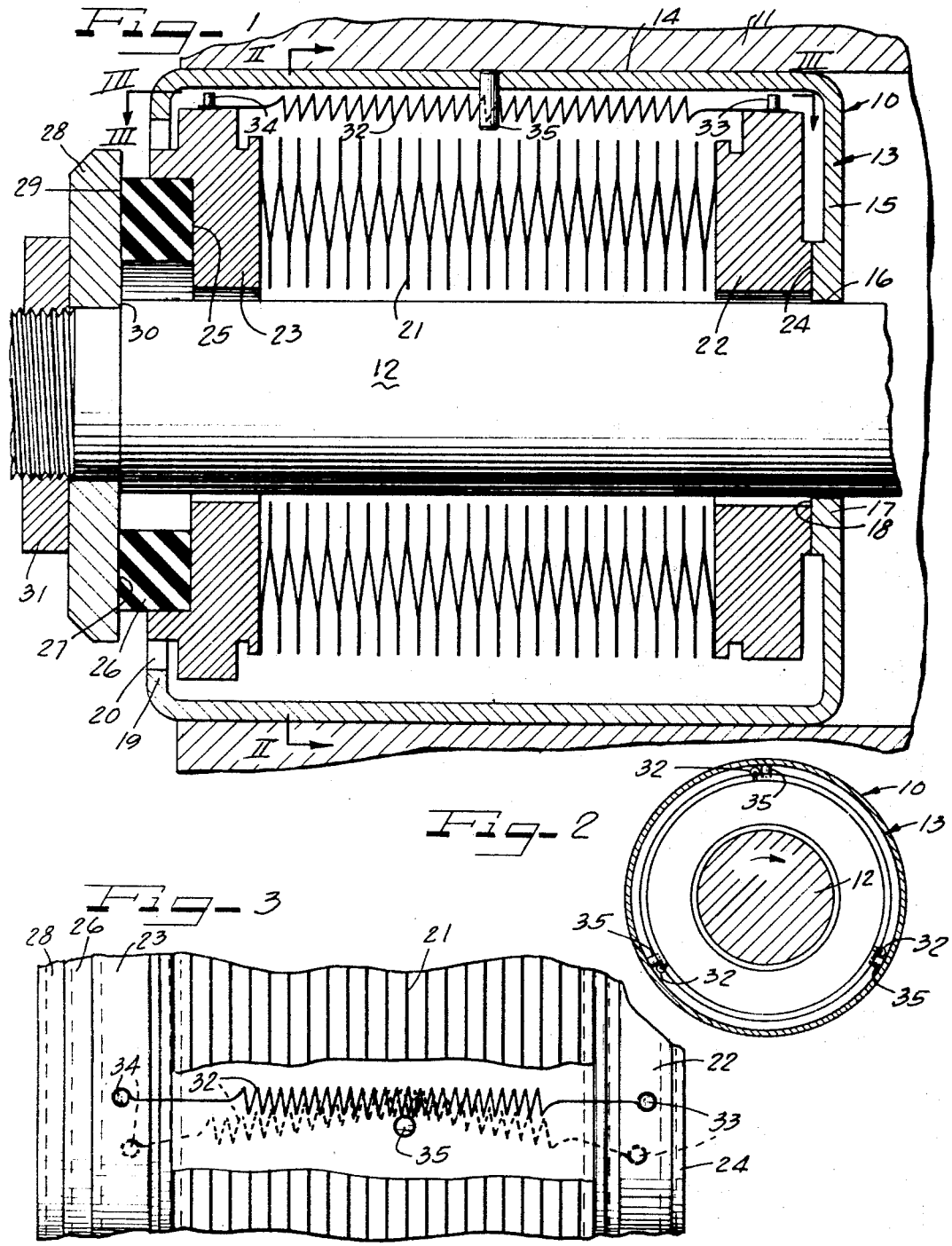

1

3,445,119
SELF-COMPENSATING SEAL
Raymond H. Andresen, Barrington, Ill., and Larry K. Hanson, Maywood, N.J., assignors, by mesne assignments, to Gits Bros. Mfg. Co., a corporation of Delaware
Filed Oct. 28, 1966, Ser. No. 590,314
Int. Cl. F16j 15/40, 15/00; F16k 41/00
U.S. Cl. 277—3                                          4 Claims

ABSTRACT OF THE DISCLOSURE

A bellows type rotary shaft face seal having coil springs extending between the bellows backing ring and the carrier ring radially outwardly from the bellows and adapted to engage a stationary projection when the bellows is subject to rotation, the engagement acting to increase the tension of the spring to draw the carrier ring away from a rotating shaft face thereby relieving the pressure at the seal interface in response to rotational pressure imparted to the carrier ring.

---

This invention relates to a self-compensating face-type seal capable of operating at high velocities while sealing against high pressures without undergoing undue wear or developing undue heat. Specifically, this invention deals with a shaft seal which will automatically unload in response to increases in pressure and velocity for maintaining an effective seal without damage to the parts.

The invention will hereinafter be described as embodied in a bellows-type rotary shaft face seal. However, it will be understood that the principles of this invention are not limited to this preferred embodiment and are generally applicable to radial or segmented shaft riding seals.

In the preferred illustrated embodiment, a spring metal bellows confined within a housing has a backing ring secured to one end thereof and a carrier ring secured to the other end thereof. The carrier ring mounts a conventional graphitic carbon seal ring which rides on a shaft carried rotating mating ring in face-to-face engagement therewith. The bellows exerts an expansion load against the backing ring, holding it in sealing face-to-face engagement with an end wall of the casing and also urges the carrier ring to project the graphitic carbon ring out of the opposite end of the casing and against the rotating shaft carried mating ring.

In this construction, the pressure to be sealed is vented to the interior of the bellows, adding to its expansion force in urging the graphitic carbon seal ring against the mating ring and in also urging the backing ring against the casing. Thus, when either the contained pressure increases or the rotary speed of the shaft mating ring increases, the frictional grip of the rotating ring against the graphitic carbon stationary ring increases with attendant increased wear and heat generation. According to this invention, this potentially destructive increased friction is automatically compensated by relieving the load on the graphitic carbon ring. Since the mating ring tends to drag the graphitic carbon sealing ring along with it and since the amount of drag will be increased in proportion to increases in pressure and speed at the sealing interfaces, conditions may be reached where the stationary bellows assembly begins to rotate. When such conditions are reached, the seals of this invention interpose a counteracting force relieving the load sufficiently to maintain the stationary condition of the bellows assembly.

In the illustrated embodiment, the means for relieving the load when the stationary assembly tends to rotate, takes the form of tension springs which are stretched by rotation of the bellows assembly. This stretching of the springs pulls the stationary assembly in such a manner as to contract the assembly, thereby relieving the load. A slip-stick action is thereby created which can be properly controlled to maintain a constant frictional contact between the seal and mating rings that is just sufficient to maintain the seal, but not great enough to damage the sealing faces.

Thus, the seals of this invention can maintain sufficient sealing capacity throughout widely varying pressure conditions and at widely varying speeds without undue wear and heat generation. The seals of this invention are especially adapted for high pressure, high temperature gas turbine conditions.

It is then an object of this invention to provide a face-type seal which will generate an optimum sealing load under widely varying contained pressure and operating speed conditions.

Another object of this invention is to provide a rotary shaft seal which will automatically unload the sealing faces thereof in response to frictional drag imposed thereon.

A specific object of this invention is to provide a bellows-type rotary shaft seal with a backing ring and a seal carrying ring secured to opposite ends of a spring bellows wherein the assembly is contracted in response to rotational movement imparted thereto.

Another specific object of this invention is to provide a rotary shaft seal of the spring metal bellows type wherein the bellows assembly is contracted by tension springs in response to rotary displacement thereof by a rotating shaft ring.

Other and further objects of this invention will be apparent to those skilled in this art from the following detailed description of the annexed sheet of drawings which, by way of a preferred example only, illustrates one embodiment of the invention.

On the drawings:

FIGURE 1 is a longitudinal cross-sectional view of a self-compensating shaft seal according to this invention bounded for operation around a shaft;

FIGURE 2 is a transverse sectional view, on a reduced scale, taken along the line II—II of FIGURE 1;

FIGURE 3 is a fragmentary longitudinal cross-sectional view taken substantially along the line III—III of FIGURE 1.

As shown on the drawings:

In FIGURE 1, the reference numeral 10 designates generally a seal assembly according to this invention mounted in a housing 11 and around a shaft 12. The seal assembly 10 includes a cylindrical metal casing 13 pressed into a bore 14 of the housing 11. The casing 13 has a radial end wall 15 with a central aperture 16 receiving the shaft 12 freely therethrough. The end wall 15 has a thickened boss 17 surrounding the aperture 16 and providing a radial sealing face 18 inside the casing around the aperture. The opposite end of the casing is open with an inturned flange 19 surrounding a large diameter circular opening 20.

A spring metal cylindrical bellows 21 is positioned in the casing and has a metal backing ring 22 secured to one end thereof and a metal seal carrier ring 23 secured to the opposite end thereof. The end faces of the bellows 21 may be secured and sealed to the rings 22 and 23 as by means of solder, welding, cement or the like.

The rings 22 and 23 have central apertures therethrough freely embracing the shaft 12. The ring 22 has a raised end face 24 bottomed on the face 18 of the casing end wall 15.

The ring 23 has a recess 25 in its outer face, receiving a graphitic carbon seal ring 26 in tight fitting pressed relation therein. The seal ring 26 has a large diameter aperture therethrough preferably larger than the aperture of the carrier ring 23.

A radial sealing face 27 is provided on the exposed outer face of the seal ring 26 and extends from the inner to the outer periphery of the seal ring.

The shaft 12 has a metal mating ring 28 secured thereon and providing a radial sealing face 29 for sealing engagement with the face 27 of the sealing ring 26. As illustrated, the mating ring 28 is anchored against a shoulder 30 of the shaft 12 and clamped to the shaft by a nut 31 threaded on the shaft.

In accordance with this invention, tension springs 32, preferably three in number, are disposed equidistantly around the bellows assembly in the casing 13 and are anchored at opposite ends to pins 33 and 34 projecting radially from the peripheries of the backing ring 22 and carrier ring 23, respectively. The casing 13 carries pins 35 about midway from the ends of the casing to engage the midpoints of the springs 32.

In the assembly of FIGURE 1, the casing is fixedly mounted in the housing and the bellows assembly in the casing is spring-loaded by the bellows so that the backing ring 22 is sealed against the end wall of the casing while the sealing ring 26 is sealed against the radial face of the mating ring 28. The shaft, of course, drives the mating ring therewith. Pressure from within the housing 11 is exposed to the interior of the bellows assembly and is sealed in the housing by the mating radial end faces 27 and 29 of the seal ring and mating ring, respectively. If desired, the spring load of the bellows 21 can be augmented by a secondary compression spring (not shown) so that the bellows carried assembly will be engaged with the casing and mating ring under sufficient load to resist rotation relative to the casing. As the contained pressure increases, the load on the sealing faces of the rings at the opposite ends of the bellows will also increase. In addition, as the speed of the shaft increases, the tendency to rotate the bellows assembly with the shaft will also increase. However, as soon as the stationary inertia of the bellows assembly is overcome and the assembly begins to rotate with the mating ring, the springs 32 will be stretched and will exert a contracting force on the bellows assembly, relieving the loads of the end faces of the backing ring and sealing ring against the end wall of the casing and mating ring, thereby relieving the frictional grip or dragging force of the mating ring on the seal ring and allowing the tension springs to pull back the assembly to its initial position. A slip-stick phenomenon is thus created at the interfaces of the sealing and mating rings which will prevent excessive wear and heat generation and will accomodate the seal for efficient use under widely varying pressure and speed conditions. Thus, the seal may be designed to maintain an efficient sealing load against the mating ring under normal operations without imparting high frictional resistance at the sealing interfaces. Then, when increased speeds and/or contained pressures are encountered, the assembly will be automatically adjusted to prevent development of excessive friction at the interfaces.

The backing ring 22 permits the entire bellows-carried assembly to rotate under the influence of increased frictional drag imparted to the seal ring without imposing any twisting action on the bellows 21.

It will, therefore, be understood that the seals of this invention can be designed in terms of the slip-stick phenomenon to maintain a constant frictional contact between the sealing interfaces that is just sufficient to seal, but not great enough to damage the faces. An equilibrium can be reached where the tension springs exert just enough force to overcome the wear conditions and heat generation created by increased loads at the interfaces without destroying the sealing efficiency.

It will, of course, be understood that the tension springs 32 may be replaced with other means for compensating the effect of increased pressures and speeds on the sealing interfaces and that the illustrated tension springs represent only a preferred simplified arrangement of accomplishing this function.

Although minor modifications might be suggested by those versed in the art, it should be understood that we wish to embody within the scope of the patent granted hereon, all such modifications as reasonably and properly come within the scope of our contribution to the art.

We claim as our invention:

1. A shaft seal or the like which comprises a first seal member, a second seal member in sealing engagement with said first member, said first and second members being relatively rotatable, means for urging said members into sealing contact, and means relieving the action of said urging means in response to rotational movement imparted to one of said members by the other of said members.

2. A self-compensating rotary shaft seal having a non-rotating seal member, a rotating seal member in sealing contact therewith, spring means urging the stationary seal member against the rotating seal member, and compensating means for relieving the spring load on the stationary seal member in response to rotational movement imparted to the stationary seal member by the rotating seal member.

3. A face-type shaft seal which comprises a bellows, a backing ring secured at one end of the bellows, a carrier ring secured at the opposite end of the bellows, a seal ring carried by said carrier ring, a casing enveloping said bellows and rings, said casing having an end wall receiving said backing ring in sealed contacting engagement therewith, a rotating mating ring outside of said casing, said bellows urging said seal ring beyond one end of the casing into sealed engagement with said rotating mating ring, tension springs in the casing anchored at the opposite ends thereof to said backing ring and said carrier ring, casing-carried means abutting said tension springs to prevent rotation thereof in the casing, and said tension springs and casing-carried means being effective to relieve the load of the backing ring and sealing ring on the casing end wall and mating ring respectively to stop rotation of the bellows assembly in the casing in response to the rotating influence of the mating ring on the sealing ring.

4. A self-compensating face-type shaft seal which comprises a casing adapted to be press-fitted into a housing to be sealed and having a shaft-receiving passage therethrough, a spring bellows in said casing, a backing ring in said casing secured and sealed to one end of said bellows, said backing ring engaging an end wall of the casing, a seal-carrying ring secured and sealed to the opposite end of the bellows in said casing, a graphitic carbon seal ring carried by said seal-carrying ring, tension springs in said casing spanning the space between said backing ring and seal-carrying ring and anchored thereto, pins projecting into the casing engaging the midpoints of said tension springs, said seal ring having a radial end face projecting beyond said casing for sealing engagement with a shaft-carried mating ring, said bellows urging said sealing ring against the mating ring and urging said backing ring against the casing into sealed radial face-to-face engagement therewith, and said springs cooperating with said pins to pull the backing ring and seal-carrying ring toward each other in response to rotation thereof in the casing thereby relieving the sealing loads on the casing and on the mating ring.

References Cited

UNITED STATES PATENTS

| | | | |
|---|---|---|---|
| 1,826,212 | 10/1931 | Gremminger | 277—62 X |
| 2,470,419 | 5/1949 | Voytech | 277—27 X |
| 3,288,474 | 11/1966 | Gits | 277—88 |

FOREIGN PATENTS 831,168  3/1960  Great Britain.

LAVERNE D. GEIGER, *Primary Examiner.*

JEFFREY S. MEDNICK, *Assistant Examiner.*

U.S. Cl. X.R.

277—27, 62, 65, 86, 88